3,008,941
SUBSTITUTED TRIAZOLE COMPOUNDS AND
POLYMERIZATION PRODUCTS THEREOF
John W. Lynn, Charleston, W. Va., assignor to Union
Carbide Corporation, a corporation of New York
No Drawing. Filed Mar. 26, 1959, Ser. No. 802,009
5 Claims. (Cl. 260—88.3)

This invention relates to novel substituted triazole compounds as new compositions of matter, and to processes for their production. More particularly, this invention is concerned with unsaturated amide derivatives of triazole, and its derivatives, as new compositions of matter, and with processes for their production.

The novel substituted triazole compounds of this invention can be graphically depicted by the formula

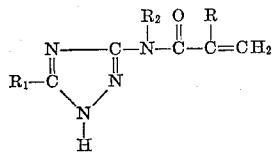

wherein R is a member selected from the group consisting of hydrogen, lower alkyl, phenyl, acyl, acyloxy, lower alkyl sulfinyloxy, cyano, nitro and halogen radicals, and $R_1$ and $R_2$ are members selected from the group consisting of hydrogen, lower alkyl and phenyl radicals. By the term "lower alkyl" as used herein is meant an alkyl radical having from 1 to 5 carbon atoms. Illustrative examples of the novel substituted triazole compounds of this invention include N-(1,2,4-triazol-3-yl)acrylamide which can be represented by the formula

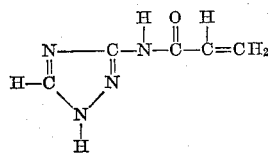

and N-(1,2,4-triazol-3-yl)methacrylamide which can be represented by the formula

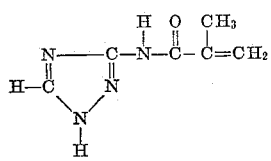

and such compounds as N-methyl-N-(1,2,4-triazol-3-yl-5 - methyl)acrylamide, N - (1,2,4 - triazol - 3 - yl) - 2-phenylacrylamide, N - (1,2,4 - triazol - 3 - yl - 5 - phenyl) - 2 - methoxyacrylamide, N - methyl - N - (1,2,4-triazol - 3 - yl) - 2 - cyanoacrylamide, N - (1,2,4 - triazol - 3 - yl - 5 - ethyl) - 2 - nitroacrylamide, N - (1,2,4-triazol-3-yl-5-amyl)-2-chloroacrylamide, N-amyl-N-(1,2,4 - triazol - 3 - yl)acrylamide, N - ethyl - N - (1,2,4 - triazol - 3 - yl)methacrylamide, N - phenyl - N - (1,2,4-triazol - 3 - yl - 5 - methyl)methacrylamide, N - methyl-N-(1,2,4-triazol-3-yl-5-phenyl)methacrylamide and the like.

The novel substituted triazole compounds of this invention can be produced by the reaction of an aminotriazole compound with an unsaturated acid chloride or anhydride. The aminotriazole compounds which can be employed as starting materials can be graphically depicted by the formula

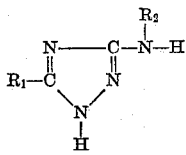

wherein $R_1$ and $R_2$ are as above defined. Illustrative of such starting materials is 3-amino-1,2,4-triazole which can be represented by the formula

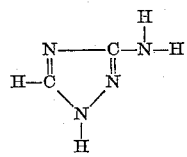

and 3-amino-5-methyl-1,2,4-triazole which can be represented by the formula

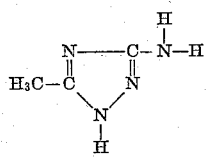

and such compounds as 3-(N-methylamino)-5-methyl-1,2,4-triazole, 3-amino-5-phenyl-1,2,4-triazole, 3-(N-methylamino) - 1,2,4 - triazole, 3 - amino - 5 - ethyl - 1,2,4-triazole, 3-amino-5-amyl-1,2,4-triazole, 3-(N-amylamino)-1,2,4-triazole, 3-(N-ethylamino)-1,2,4-triazole, 3-(N-phenylamino) - 5 - methyl - 1,2,4 - triazole, 3 - (N - methylamino)-5-phenyl-1,2,4-triazole and the like.

The unsaturated acid chlorides and anhydrides which can be employed as starting materials in preparing the novel compounds of this invention can be graphically depicted by the formulae

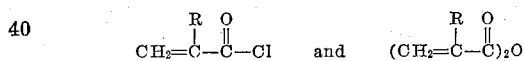

wherein R is as above defined. Illustrative of such starting materials are such compounds as acrylyl chloride, acrylyl anhydride, methacrylyl chloride, methacrylyl anhydride, 2-ethylacrylyl chloride, 2,2'-diethylacrylyl anhydride, 2-amylacrylyl chloride, 2,2'-diamylacrylyl anhydride, 2-phenylacrylyl chloride, 2,2'-diphenylacrylyl anhydride, 2-methoxyacrylyl chloride, 2,2'-dimethoxyacrylyl anhydride, 2-cyanoacrylyl chloride, 2,2'-dicyanoacrylyl anhydride, 2-nitroacrylyl chloride, 2,2'-dinitroacrylyl anhydride, 2-chloroacrylyl chloride, 2,2'-dichloroacrylyl anhydride and the like.

The compounds which can be employed as starting materials in preparing the novel compounds of this invention are known materials and can be produced in accordance with procedures customarily employed for preparing such compounds.

The process of the instant invention, which comprises reacting an aminotriazole compound with an unsaturated acid chloride or anhydride, can be illustrated by the following graphic equations

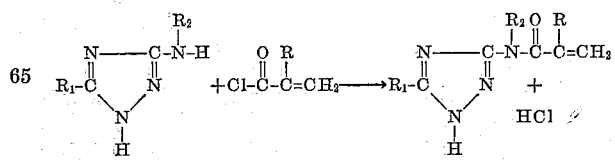

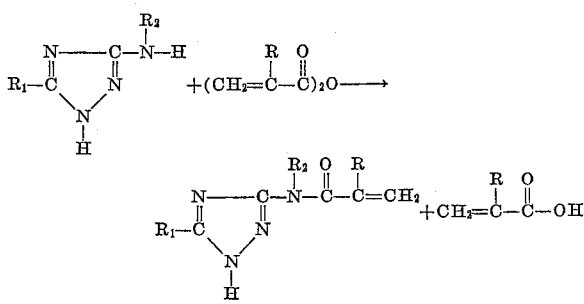

wherein R, $R_1$ and $R_2$ are as above defined. Thus, for example, N-(1,2,4-triazol-3-yl)acrylamide can be prepared by the reaction of 3-amino-1,2,4-triazole with acrylyl chloride or acrylyl anhydride, and N-(1,2,4-triazol-3-yl)methacrylamide can be prepared by the reaction of 3-amino-1,2,4-triazole with methacrylyl chloride or methacrylyl anhydride. Since the activity of the hydrogen atom attached to the nitrogen atom outside the ring of the aminotriazole is greater than the activity of the hydrogen atom attached to the ring nitrogen atom due to electron resonance within the ring, the unsaturated acid chloride or anhydride employed does not attach to the ring nitrogen atom, and the products of the reaction do not contain any new substituents directly attached to the ring of the aminotriazole.

When effecting reaction according to the process of the instant invention, it is preferable to employ equimolar proportions of reactants, or a slight excess of acid chloride anhydride, e.g. up to 10 percent excess of acid chloride or anhydride. Greater or lesser amounts of either reactant, for example, amounts ranging from as little as 0.5 mole of acid chloride or anhydride to as much as 2 moles of acid chloride or anhydride per mole of aminotriazole compound present, can also be employed; however, such proportions of reactants do not provide the advantages obtainable by operating with the narrower range indicated above.

When employing an acid chloride as one of the starting materials in the process of the instant invention, it is necessary to effect reaction in the presence of a reagent capable of combining with the hydrogen chloride liberated by the reaction. Suitable hydrogen chloride acceptors include the oxides and hydroxides of the alkali or alkaline earth metals, as well as the alkali or alkaline earth metals themselves, and such strongly basic non-metallic compounds as the quaternary ammonium hydroxides and tertiary amines. Specific examples of hydrogen chloride acceptors which can be employed include sodium hydroxide, potassium hydroxide, lithium hydroxide, sodium oxide, trimethylbenzylammonium hydroxide, benzyltriethylammonium hydroxide, dimethyldibenzylammonium hydroxide, trimethylamine, triethylamine, tri-n-propylamine, methyldiethylamine, dimethylethylamine, benzyldimethylamine, and benzyldiethylamine. The amount of hydrogen chloride acceptor employed should at least be sufficient to combine with the hydrogen chloride present, but excess amounts can be employed to ensure complete removal of hydrogen chloride.

When employing an acid anhydride instead of an acid chloride as one of the starting materials in the process of the instant invention, no hydrogen chloride is liberated as a result of the reaction, and the use of a hydrogen chloride acceptor is not necessary. However, in such case, it has been found that reaction is promoted by the use of a suitable catalyst, such as a strong acid or tertiary amine. Specific examples of the catalysts which can be employed include strong acids such as sulfuric acid, hydrochloric acid, nitric acid, phosphoric acid and p-toluenesulfonic acid, and tertiary amines such as trimethylamine, triethylamine, tri-n-propylamine, methyldiethylamine, dimethylethylamine, benzyldimethylamine, and benzyldiethylamine. The catalyst is usually employed in an amount of from as low as 0.01 percent by weight to as high as 1.0 percent by weight, preferably from 0.1 percent by weight to 0.5 percent by weight, of the combined weight of reactants employed. Greater or lesser amounts of catalyst can also be employed; however, the use of such amounts of catalyst do not provide the advantages obtainable by operating within the indicated range and is not recommended.

Reaction according to the process of the instant invention readily occurs at temperatures ranging from as low as 0° C. to as high as 100° C. Preferably reaction is effected at temperatures ranging from about 10° C. to about 50° C. Temperatures both above and below the broadly disclosed range can also be employed; however, such temperatures do not provide the advantages obtainable by operating within such temperature range.

Atmospheric pressure is usually employed in effecting reaction according to the process of the instant invention. However, pressures both above and below atmospheric pressure, for example, pressures ranging from as low as 300 mm. Hg to as high as 1000 p.s.i., can also be employed whenever it is desirable to do so.

Reaction according to the process of the instant invention may be effected in an inert liquid solvent. By an inert liquid solvent is meant a liquid solvent in which the starting materials are soluble to an extent whereby they are brought into reactive contact and which itself is non-reactive under the conditions of the reaction. Suitable inert liquid solvents which can be employed for such purpose include water, hydrocarbons such as hexane, cyclohexane, heptane, benzene, toluene and the like, ethers such as dioxane, tetrahydrofuran and the like, and ketones such as acetone and the like. In general, an amount of solvent ranging from 0 to about 10 times, preferably from 0 to 5 times, the weight of reactants present can be effectively employed. Greater amounts of solvent can also be employed; however, such amounts of solvent do not provide the advantages obtainable by operating within the range indicated.

The novel substituted triazole compounds of this invention find wide use in the preparation of polymeric materials. Thus, such compounds, because of the vinyl group present, can be readily homopolymerized, or copolymerized with certain vinyl-containing organic compounds, such as styrene, butadiene, vinyl acetate, methyl acrylate, methyl methacrylate, vinyl chloride, vinylidene chloride, acrylonitrile, methacrylonitrile, vinylidene cyanide, acrylamide and the like. By the term "polymer" as used in the specification is meant a homopolymer of the novel substituted triazole compounds of this invention, or a copolymer of such compounds with one or more other polymerizable monomers.

Any suitable means can be employed in effecting polymerization of the novel substituted triazole compounds of this invention. For example, polymerization can be effected by means of heat, light, or a suitable vinyl polymerization catalyst, such as a peroxide or azo compound. Preferably polymerization is effected by heating in the presence of a polymerization catalyst in order to shorten the reaction time. Temperatures ranging from as low as 40° C. to as high as 150° C. are generally effective for this purpose. Among the peroxides which can be employed for such purpose may be mentioned hydrogen peroxide, barium peroxide, magnesium peroxide, diethyl peroxide, distearyl peroxide, acetyl peroxide, stearoyl peroxide, and acetyl benzoyl peroxide, while specific examples of the azo compounds which can be employed include α,α'-azodiisobutyronitrile and 2,2'-dicyanoazobenzene.

If desired, the novel substituted triazole compounds of this invention can be polymerized from an emulsion or from a solution of the starting monomers. Good results are obtained by effecting polymerization in an inert liquid solvent such as water, benzene, toluene, xylene, and the like.

The polymeric materials produced by polymerizing the novel substituted triazole compounds of this invention are useful as fungicides and as coagulants for sewage sludge.

The following examples of my invention are set forth for purposes of illustration so that those skilled in the art may better understand my invention, and it should be understood that they are not to be construed as limiting my invention in any manner.

EXAMPLE I

*Preparation of N-(1,2,4-triazol-3-yl)methacrylamide*

An admixture of 8.4 grams of 3-amino-1,2,4-triazole (0.1 mol), 40 ml. of water, and 8 grams of sodium hydroxide (0.2 mole) was prepared and maintained at a temperature of 10° C. by cooling while 11.9 grams of methacrylyl chloride (0.114 mole) were added over a 20 minute period. The precipitate obtained by this procedure was removed by filtration, dissolved in ethanol, and partially reprecipitated by the addition of ethyl ether. About 1 gram of crystalline N-(1,2,4-triazol-3-yl)methacrylamide was recovered. This material had a melting point of 189–192° C., and was identified by its infrared absorption spectrum and by chemical analysis for nitrogen. *Analysis.*—Calcd. for $C_6H_8N_4O$: N, 28.15%. Found: N, 28.70%.

EXAMPLE II

*Homopolymerization of N-(1,2,4-triazol-3-yl)methacrylamide*

The ethanol-ethyl ether mixture of Example I from which the N-(1,2,4-triazol-3-yl)methacrylamide monomer present had been partially precipitated was allowed to stand undisturbed for several days at room temperature. The viscous mass obtained thereby indicated that polymerization of the monomer remaining in the mixture had occurred.

Unless otherwise specified, all parts and percentages, as used throughout this specification, are by weight.

What is claimed is:

1. The novel triazole compounds represented by the general formula

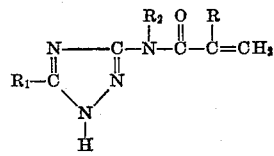

wherein R is a member selected from the group consisting of hydrogen and methyl radicals, and $R_1$ and $R_2$ are hydrogen radicals.

2. N-(1,2,4-triazol-3-yl)acrylamide.
3. N-(1,2,4-triazol-3-yl)methacrylamide.
4. A homopolymer of N-(1,2,4-triazol-3-yl)methacrylamide.
5. A homopolymer of N-(1,2,4-triazol-3-yl)acrylamide.

References Cited in the file of this patent

UNITED STATES PATENTS

| | | |
|---|---|---|
| 2,534,914 | Kendall et al. | Dec. 19, 1950 |
| 2,850,485 | D'Alelio | Sept. 2, 1958 |